US009571759B1

(12) United States Patent
Adsumilli et al.

(10) Patent No.: US 9,571,759 B1
(45) Date of Patent: Feb. 14, 2017

(54) SEPARATE RANGE TONE MAPPING FOR COMPONENT IMAGES IN A COMBINED IMAGE (71) Applicant: GoPro, Inc., San Mateo, CA (US)

(72) Inventors: Balineedu Chowdary Adsumilli, San Mateo, CA (US); Timothy MacMillan, LaHonda, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/872,017

(22) Filed: Sep. 30, 2015

(51) Int. Cl.
*H04N 9/64* (2006.01)
*H04N 5/341* (2011.01)
*H04N 9/77* (2006.01)
*H04N 5/247* (2006.01)
*G03G 15/36* (2006.01)

(52) U.S. Cl.
CPC ............ *H04N 5/3415* (2013.01); *G03G 15/36* (2013.01); *H04N 5/247* (2013.01); *H04N 9/646* (2013.01); *H04N 9/77* (2013.01); *G01B 2210/52* (2013.01)

(58) Field of Classification Search
None
See application file for complete search history.

(56) References Cited

U.S. PATENT DOCUMENTS 5,982,951 A * 11/1999 Katayama ............ H04N 1/3876
348/584
8,077,214 B2 * 12/2011 Kondo .................. G06T 3/4038
348/218.1

* cited by examiner

*Primary Examiner* — Mark T Monk
(74) *Attorney, Agent, or Firm* — Fenwick & West LLP (57) ABSTRACT Use of separate range tone mapping for combined images can help minimize loss of image information in scenes that have drastically different luminance values, i.e., scenes that have both bright and shadowed regions. Separate range tone mapping is particularly useful for combined images, such as those from spherical camera systems, which may have a higher probability of including luminance variability. The resulting increased bit depth of separate range tone mapping can make the transition between different images that make up a combined image more subtle. Each of a plurality of images that make up a combined image can use a different tone map that is optimized for the particular image data of the image. Multiple tone maps that are applied to overlapping regions of the plurality of images can subsequently be combined to expand the bit depth of the overlapping regions.

20 Claims, 9 Drawing Sheets

|  | 810a | 810b | 850 |
|---|---|---|---|
|  | — 7 812a | — 812b | — 9 852 |
|  | — 814a | | — 854 |
|  | 6 | 7 | 8 |
|  | — 816a | | — 856 |
|  | 5 | | 7 |
|  | — 818a | — 814b | — 858 |
|  | 4 | 6 | 6 |
|  | — 820a | | — 860 |
|  | 3 | — 816b | |
|  | — 822a | 5 | 5 |
|  | 2 | — 818b | — 862 |
|  | — 824a | 4 | 4 |
|  | 1 | — 820b | — 864 |
|  | — 826a | 3 | 3 |
|  | | — 822b | — 866 |
|  | | 2 | 2 |
|  | 0 | — 824b | — 868 |
|  | | 1 | 1 |
|  | | — 826b | — 870 |
|  | | 0 | 0 |
|  | — 828a | — 828b | — 872 |

SEPARATE RANGE TONE MAPPING FOR COMPONENT IMAGES IN A COMBINED IMAGE

BACKGROUND

Technical Field

This disclosure relates to image processing, and more specifically to performing separate range tone mapping on combined images.

Description of the Related Art

Tone mapping can be important when capturing, storing and reproducing images because often the bit depth of the image's pixels have a limited dynamic range that is inadequate to capture all of the light intensities present in real-life scenes. Accordingly, tone maps specify which ranges of luminance are mapped to each bit value. General tone maps can be applied to images regardless of the content of the images. For example, tone map bit values may be allocated evenly across the luminance spectrum. However, tone maps can also be adapted based on image content to best represent the real-life scene captured in the image. For example, a scene that is dark or mostly shadowed may use a tone map that allocates more bit values to the darker end of the luminance spectrum than a tone map for an average scene. Similarly, a scene that is particularly bright or light may use a tone map that allocates more bits values to the lighter end of the luminance spectrum than a tone map for an average scene. However, when a scene contains both shadowed and bright features, application of a single tone map may compress features on either edge of the spectrum due to the limited bit depth of the tone map.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. (or "FIG.") 1 illustrates a spherical camera system made up of two cameras that together are capable of capturing spherical content, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Use of separate range tone mapping for combined images can help minimize the loss of image information in scenes that have different luminance characteristics, i.e., scenes that have both bright and shadowed components. As used herein, "separate range tone mapping" refers to the generation of a separate tone map for each image captured by a single camera in a multi-camera array. Separate range tone mapping is particularly useful for combined images such as those captured by spherical camera systems because there is a higher chance of luminance variability between the different images that make up such a combined image. Additionally, separate range tone mapping can increase the bit depth of overlapping regions of combined images by combining each individual tone map generated for images captured by a multi-camera array for overlapping portions of the images, which can make the transition between the individual images within the combined image more subtle. It should be noted that while reference is made to the performance of separate range tone mapping for spherical camera systems herein, the principles described herein are not limited to spherical camera systems and apply equally to any multi-camera system, particularly multi-camera arrays with overlapping fields of view.

As used herein, a "combined image" refers to an image produced by combining a set of images synchronously captured by a multi-camera array. Each tone map generated for an image in the set of images is determined based on luminance data from the corresponding image and includes a bit assignment scheme that maps ranges of luminance values to bit values. The tone map for each of the set of images can be optimized based on the image data of the image. Multiple tone maps representative of overlapping images can be combined to expand the bit depth of the tone map for the overlapping region of the images, thereby increasing the amount of luminance spectrum represented by the combined tone map (and increasing the dynamic range).

Example Camera Array Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

A camera array configuration includes a plurality of cameras, each camera having a distinctive field of view. For example, the camera array can include a 2×1 camera array, a 2×2 camera array, or any other suitable arrangement of cameras. Each camera can have a camera housing structured to at least partially enclose the camera. Alternatively, the camera array can include a camera housing structured to enclose the plurality of cameras. Each camera can include a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. In another embodiment, the camera array includes some or all of the various indicators, various input mechanisms, and electronics and includes the plurality of cameras. A camera housing can include a lens window structured on the front surface of the camera housing and configured to substantially align with the camera lenses of the plurality of cameras, and one or more indicator windows structured on the front surface of the camera housing and configured to substantially align with the camera indicators.

A camera array can also take the form of a spherical camera system. By definition, a spherical camera system will capture everything in the surrounding environment (e.g., 360 degrees in the horizontal plane and 180 degrees in the vertical plane). In order to capture spherical content, a spherical camera has at least two lenses that capture overlapping images that can be combined to form a spherical image using a stitching algorithm. In order to minimize the size and cost of the spherical camera, a minimum of two lenses can be used to capture suitable spherical content.

Figure 1:
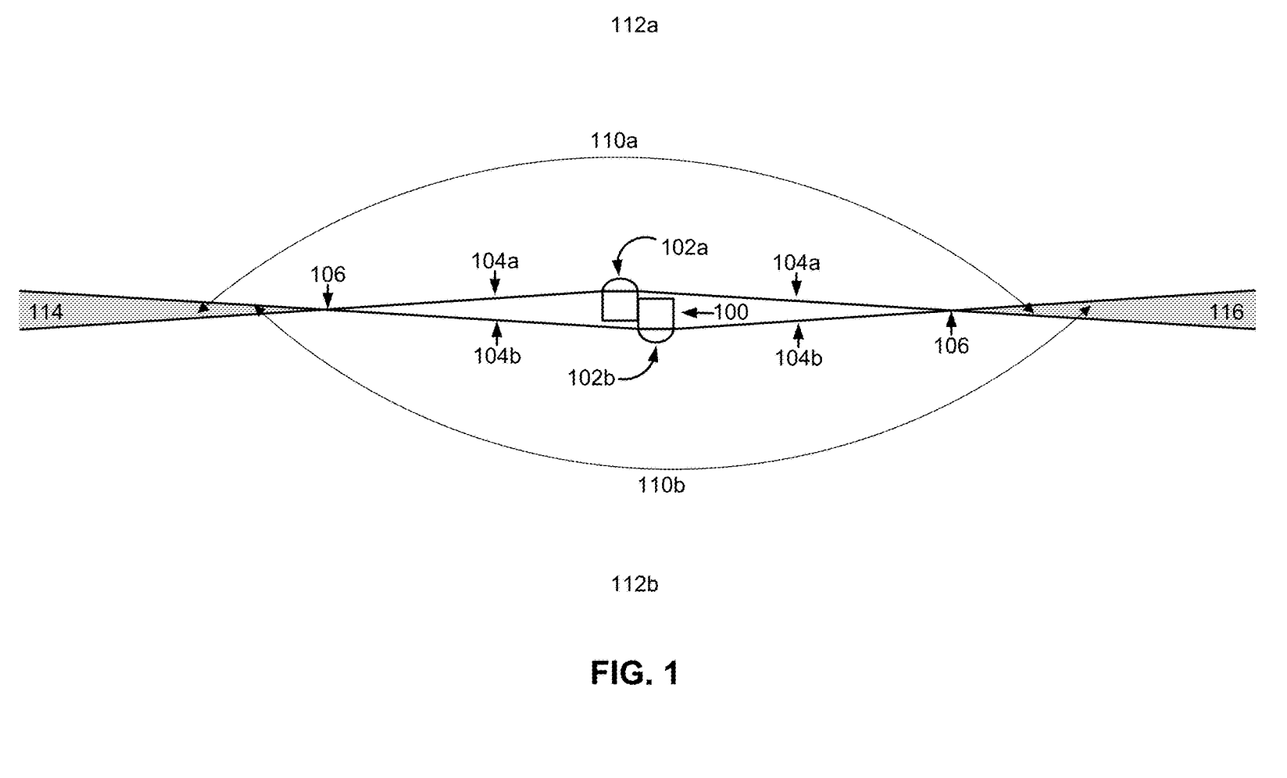

FIG. 1 illustrates a cross-sectional view and a field of view 110 of a spherical camera system 100, according to one embodiment. A first lens 102a of the spherical camera system 100 has field of view 110a with boundary 104a, in front of which the first image sensor captures a first hyper-hemispherical image plane from light entering the first lens 102a. A second lens 102b of the spherical capture system has field of view 112b with boundary 104b, in front of which the second image sensor captures a second hyper-hemispherical image plane from light entering the second lens 102b. Areas that are outside of the field of view 112 of both lenses 102 are considered blind spots because no content is being captured from those areas. It is desirable to minimize such blind spots in order to capture as much content from the environment surrounding the spherical camera system 100 as possible. Outside of overlap points 106, content captured by each lens 102 overlaps to form overlapping regions 114 and 116. This is contrasted with the non-overlapping regions 112a and 112b, for which only one lens captures image information. It should be noted that although individual lenses 102a and 102b are referenced herein, in practice each of lenses 102a and 102b can be a distinct camera coupled such that each camera synchronously captures image information. The overlapping regions 114 and 116 can be correlated in post-processing in order to align the captured fields of view 110 and stitch them together to form a cohesive image.

System for Unified Image Processing

Figure 2:
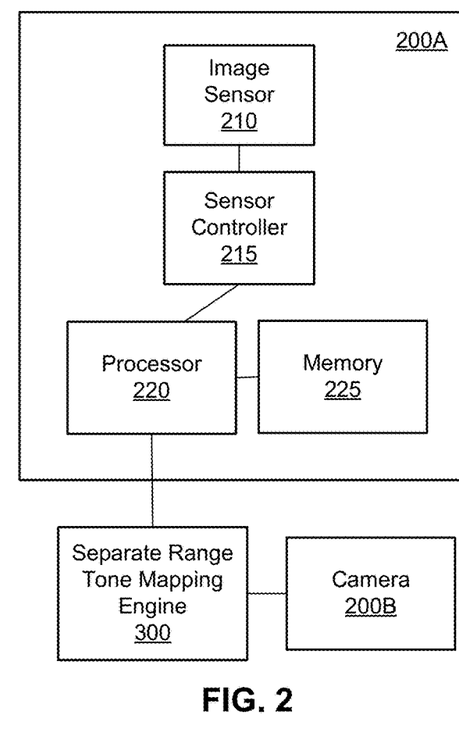
FIG. 2 is a block diagram of a spherical camera system, according to one embodiment.

FIG. 2 is a block diagram of a spherical camera system, according to one embodiment. The multi-camera array includes two cameras 200A-B, and each camera includes an image sensor 210, a sensor controller 215, a processor 220, and memory 225. In another embodiment, the two cameras 200A-B can have image sensors 210 that share a common processor 220, and memory 225. The separate range tone mapping engine 300 processes images associated with the four cameras 200A-D. In various embodiments, the cameras 200A-B can include additional, fewer, or different components for various applications, and the array system of FIG. 2 can include fewer or additional cameras.

The image sensor 210 is a device capable of electronically capturing light incident on the image sensor 210. In one embodiment, each image sensor 210 is a CMOS image sensor, including transistors, photodiodes, amplifiers, analog-to-digital converters, and power supplies. In one embodiment, the image sensor 210 has rolling shutter functionality, and can capture light incident upon different portions of the image sensor at slightly different times over a capture interval. Alternatively, the image sensor 210 can be a CCD sensor configured to can capture the portions of the image at substantially the same time.

The processor 220 is one or more hardware devices (e.g., a central processing unit (CPU), a graphics processing unit (GPU), a digital signal processor (DSP), and the like) that execute computer-readable instructions stored in the memory 225. The processor 220 controls other components of the camera based on the instructions that are executed. For example, the processor 220 may send electronic control signals to the image sensor 510 or use the separate range tone mapping engine 300 to send data to camera 200B.

The memory 225 is a non-transitory storage medium that can be read by the processor 220. The memory 225 may contain volatile memory (e.g., random access memory (RAM)), non-volatile memory (e.g., a flash memory, hard disk, and the like), or a combination thereof. The memory 225 may store image data captured by the image sensor 210 and computer-readable instructions to be executed by the processor 220.

The sensor controller 215 controls operation of the image sensor 210 and other functions of the camera 200A. The sensor controller 215 can include physical and/or electronic input devices, such as exterior buttons to start recording video and/or capture a still image, a touchscreen with tap-to-focus capabilities, and a dial/button combination for navigating a menu hierarchy of the camera 200A. In addition, the sensor controller 15 may include remote user input devices, such as remote controls that wirelessly communicate with the cameras 200A-B. The image sensor 210 may function independently of the sensor controller 215.

The separate range tone mapping engine 300 receives data from and may send data to cameras 200A-B, or to any additional entity, such as an external computing system. In particular, the separate range tone mapping engine 300 can coordinate and synchronize the capture of the images by the cameras 200A-B at substantially, and can, in response, receive image data from cameras 200A-B for processing. In the illustrated embodiment of FIG. 2, there is one separate range tone mapping engine 300 associated with the cameras 200A-B. In another embodiment, there can be a plurality of separate range tone mapping engine 300 associated with the cameras 200A-B, for instance, one separate range tone mapping engine 300 per camera. It should be noted that in some embodiments, the separate range tone mapping engine 300 is located within one or more of the cameras 200A-B, while in other embodiments, the separate range tone mapping engine 300 is located external to the cameras 200A-B, for instance in a post-processing computer system, in a cloud server, and the like.

Figure 3:
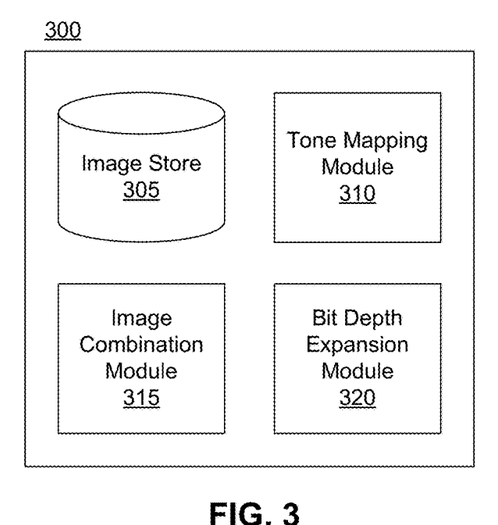
FIG. 3 is a block diagram of a separate range tone mapping engine for a spherical camera system, according to one embodiment.

FIG. 3 is a block diagram of a separate range tone mapping engine for a spherical camera system, according to one embodiment. The separate range tone mapping engine 300 includes an image store 305, a tone mapping module 310, an image combination module 315, and a bit depth expansion module 320. Alternate embodiments may have one or more additional, omitted, or alternative modules configured to perform similar functionality. It should be noted that in other embodiments, the modules described herein can be implemented in hardware, firmware, or a combination of hardware, firmware, and software. In addition, in some embodiments, a first camera in a plurality of cameras includes the components illustrated in FIG. 3, while the other cameras in the plurality of cameras do not necessarily include the components of FIG. 3 and instead rely on the separate range tone mapping engine 300 of the first camera. As used herein, a "plurality of images" refers to a plurality of images synchronously captured by the plurality of cameras, each camera capturing a portion of a field of view shared with at least one other camera. As used herein, the synchronous capture of images refers to the capture of images by two or more cameras at substantially the same time, or within a threshold period of time. Alternatively or additionally, an external computing device processes image data captured by the camera array according to the principles described herein.

The image store 305 is configured to store a plurality of images captured by each of a plurality of cameras, such as the cameras 200A-B of FIG. 2. Images in the image store 305 may be associated with other images based on when and where they were captured. For example, images captured by a multi-camera array may be stored in association with each other. Images stored in the image store 305 may be single-capture images taken by a single camera, multiple single-capture images taken by a plurality of cameras, or combined images made up of multiple single-capture images taken by a plurality of cameras and subsequently combined. As used herein, "single-capture" image refers to an image captured by one camera. Furthermore, images stored in the image store 305 may be received directly from a camera or from an external image store.

The tone mapping module 310 accesses the image store 305 to retrieve an image and converts it to a tone-mapped image by applying a tone map of a particular bit depth. To determine the tone map that best reflects and preserves the content in the accessed image, the tone mapping module 310 analyzes data from the image to determine a tone curve, which describes the luminance values in the image. Such data can include luminance information, lens and sensor data, and image content, which could be objective (color histograms) or subjective (detected faces, etc.). The tone curve is used to generate a tone map as a simple look-up-table that assigns luminance ranges or values to bit values (a "bit assignment scheme" associated with the tone map, as used herein). Applying a tone map to an accessed image results in a tone-mapped image such that all pixels of the tone-mapped image with luminance values within a luminance range mapped to a particular bit value will be mapped to the bit value. The tone-mapped image may be stored in the image store 305 for future use. In some embodiments, the bit assignment scheme is stored in association with the tone mapped image.

The image combination module 315 accesses the image store 305 to retrieve a plurality of single-capture images with overlapping regions that make up a combined image. The combined image may be made up of a plurality of images representative of a shared field of view from similar angles or perspectives, resulting in flat image, or a plurality of images representative of a shared field of view from significantly different angles perspectives, resulting in a curved image. The image combination module 315 combines the plurality of images algorithmically. When combining the single-capture images, the image combination module 315 may adjust the images to compensate for the angled fields of view of the cameras of the camera array. The images are adjusted using, for example warps, transformations, crops, or any other suitable image enhancement, restoration, and/or compression techniques. One or more of the images can be adjusted individually, or all of the images can be adjusted substantially synchronously or sequentially. Examples of image combination or "stitching" techniques can be found in co-pending U.S. patent application Ser. No. 14/308,507, titled "Image Taping in a Multi-Camera Array", filed Jun. 18, 2014; U.S. patent application Ser. No. 14/754,694, titled "Image Stitching in a Multi-Camera Array", filed Jun. 30, 2015; and U.S. patent application Ser. No. 14/637,180, titled "Generation of Video from Spherical Content Using Edit Maps", filed Mar. 3, 2015, the contents of each of which are incorporated herein by reference in their entirety.

The bit depth expansion module 320 takes a plurality of bit assignment schemes of a first bit depth and combines them to generate a combined bit assignment scheme of a second, larger bit depth or extended dynamic range. The bit depth expansion module 320 creates a combined bit assignment scheme based on the distribution of bit values in each of the plurality of bit assignment schemes. In some embodiments, the bit depth expansion module 320 also analyzes image data to determine the luminance ranges to map to each bit value. The generation of a combined bit assignment scheme is discussed below in greater detail.

Method for Separate Range Tone Mapping

Figure 4:
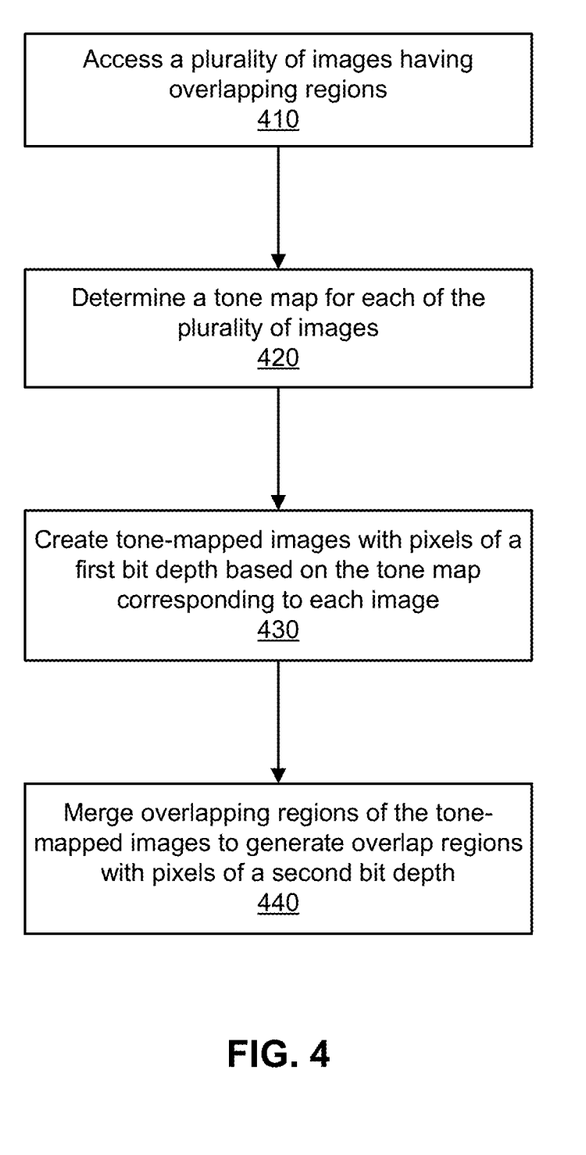
FIG. 4 is a flow chart illustrating a method for performing separate range tone mapping, according to one embodiment.

FIG. 4 is a flow chart illustrating a method for performing separate range tone mapping, according to one embodiment. The tone mapping module 310 accesses 410 a plurality of images that have overlapping regions to form a combined image. For each of the plurality of images, the tone mapping module 310 determines 420 a tone map based on image data corresponding to the image, such as luminance information and image content information. In some embodiments, each image is further divided into zones based on position or image content, and a different tone map is determined for each zone. For example, a separate tone map may be used for "stitch areas" that extend past the overlapping regions of the images. The tone mapping module 310 then applies the tone maps to the accessed images to create 430 tone-mapped images with pixels of a first bit depth.

The image combination module 315 and bit depth expansion module 320 merge 440 the overlapping regions of the tone-mapped images to generate combined tone maps for overlapping portions of the image, the combined tone maps having a second, larger bit depth than the first bit depth. In some embodiments, only the overlapping regions have a corresponding tone map with pixels of the second bit depth, while in other embodiments, the entire combined image can be mapped to a corresponding tone map with pixels of the second bit depth or an increased dynamic range.

Example Application Use of Separate Range Tone Maps

Figure 5:
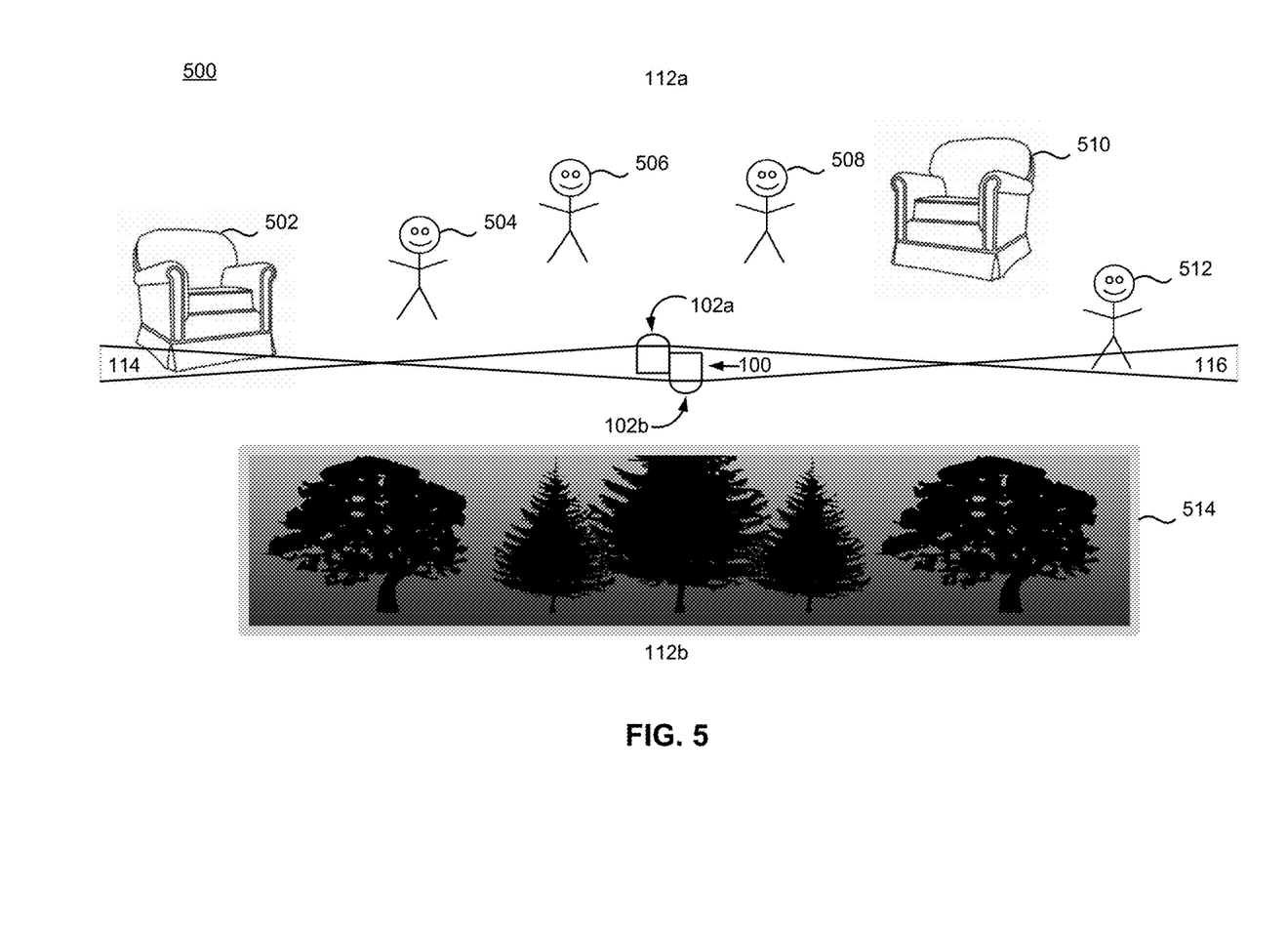
FIG. 5 illustrates an environment to be captured by a spherical camera system, according to one embodiment.

FIG. 5 illustrates an environment 500 to be captured by a spherical camera system 100, according to one embodiment. The spherical camera system 100 is located in the middle of a room containing image features 502, 504, 506, 508, 510, 512, and 514. The environment 500 has two distinct sections with significantly different levels of brightness. Specifically, the environment 500 is a brightly-lit room containing chairs (image features 502 and 510), people (image features 504, 506, 508, and 512), and a window to a dimly lit forest (image feature 514). Thus, the environment 500 is primarily bright, except around image feature 514, which is relatively dark.

The first lens 102a of the spherical camera system 100 captures a first hyper-hemispherical image plane of the environment 500, which includes the entirety of image features 502, 504, 506, 508, 510, and 512. The second lens 102b of the spherical camera system 100 captures a second hyper-hemispherical image plane, which includes the entirety of image feature 514 and portions of image features 502 and 512. Portions of image features 502 and 512 are captured by both lenses 102 because they partially lie in overlapping regions 114 and 116, as opposed to the other non-overlapping regions 112.

Figure 6A:
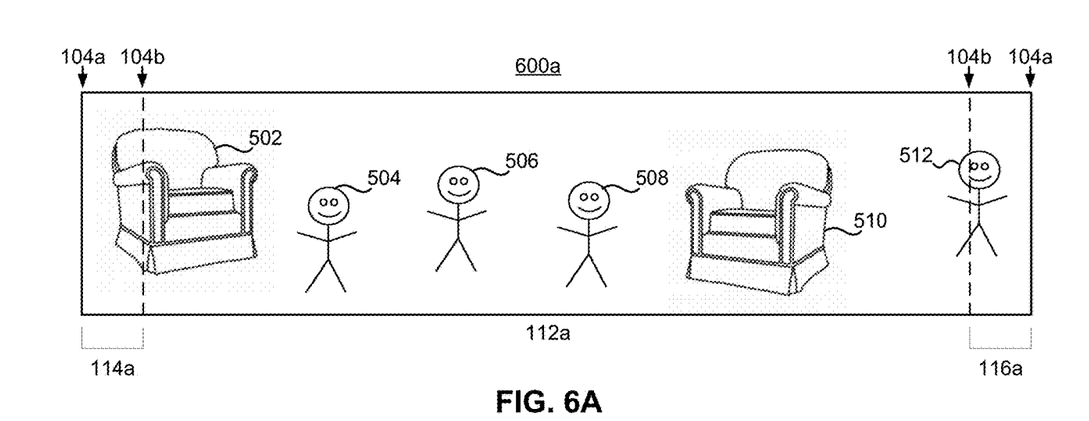
FIG. 6A illustrates a first image of a first half of an environment captured by a first camera of a spherical camera system, according to one embodiment.

FIG. 6A illustrates an image 600a of the environment 500 of FIG. 5 captured by the first lens 102a of the spherical camera system 100, according to one embodiment. The image 600a is split into a first overlapping region 114a, a non-overlapping region 112a, and a second overlapping region 116a. The first overlapping region 114a is bounded on by the field of view boundaries 104a and 104b of the first lens 102a and the second lens 102b, respectively. The non-overlapping region 112a is then bounded on both sides by the field of view boundary 104b of the second lens 102b. Similarly to the first overlapping region 114a, the second overlapping region 116a is bounded by the field of view boundaries 104b and 104a of the second lens 102b and the first lens 102a, respectively. Image 600a reflects the field of view 110a of the first lens 102a and contains the entirety of image features 502, 504, 506, 508, 510, and 512.

Figure 6B:
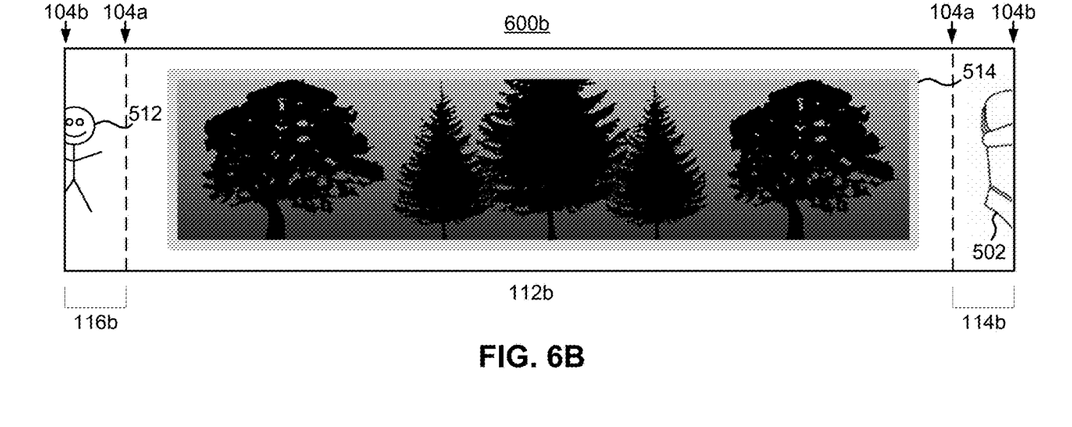
FIG. 6B illustrates a second image of a second half of an environment captured by a second camera of a spherical camera system, according to one embodiment.

FIG. 6B illustrates an image 600b of the environment 500 of FIG. 5 captured by the second lens 102b of the spherical camera system 100, according to one embodiment. The image 600a is split into a first overlapping region 116b, a non-overlapping region 112b, and a second overlapping region 114b. The first overlapping region 116b is bounded on by the field of view boundaries 104b and 104a of the second lens 102b and the first lens 102a, respectively. The non-overlapping region 112b is then bounded on both sides by the field of view boundary 104a of the first lens 102a. Similarly to the first overlapping region 116b, the second overlapping region 114a is bounded by the field of view boundaries 104a and 104b of the first lens 102a and the second lens 102b, respectively. Image 600b reflects the field of view 110b of the second lens 102b and contains the entirety of image feature 514 and portions of image features 502 and 512.

Figure 6C:
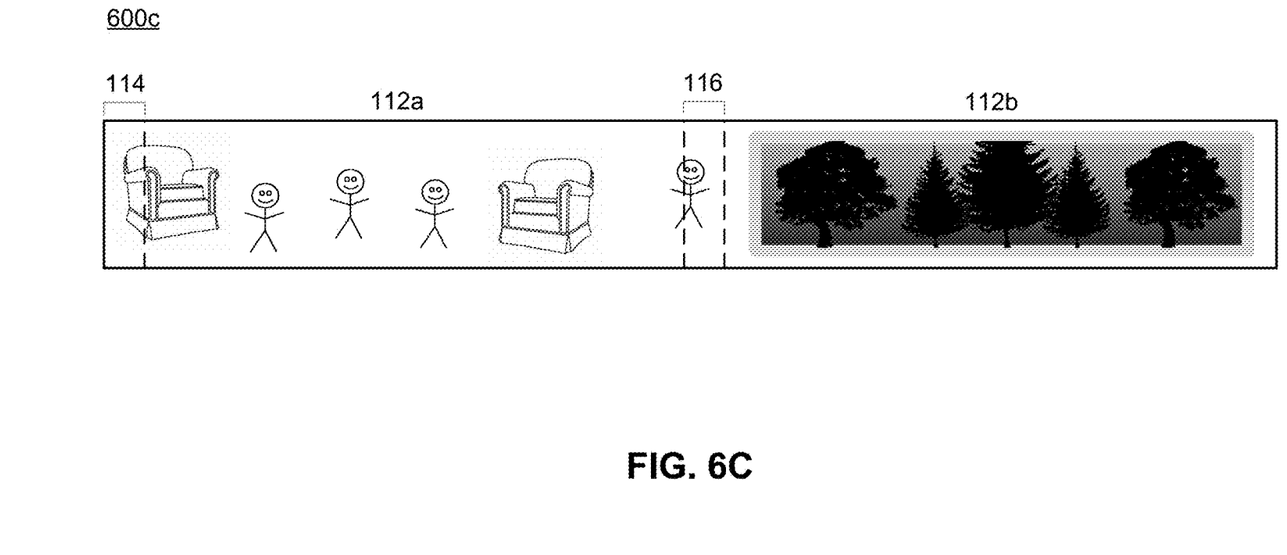
FIG. 6C illustrates a combined image of an environment captured by multiple cameras of a spherical camera system, according to one embodiment.

FIG. 6C illustrates a combined image 600c of the environment 500 of FIG. 5 captured by the both lenses 102 of the spherical camera system 100, according to one embodiment. The combined image 600c is created by stitching the images 600a and 600b based on the overlapping regions 114a-b and 116a-b. Thus, image 600c reflects the field of views 110 of both lenses 102 and contains the entirety of image features 502, 504, 506, 508, 510, 512, and 514.

Figure 7A:
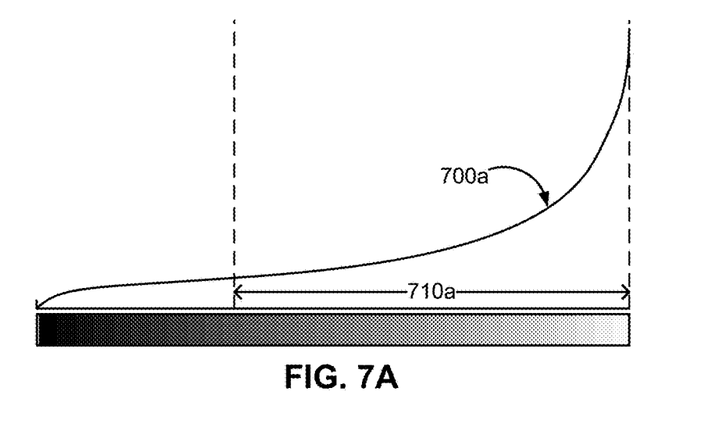
FIG. 7A illustrates a tone curve for the image of FIG. 6A, according to one embodiment.
Figure 7B:
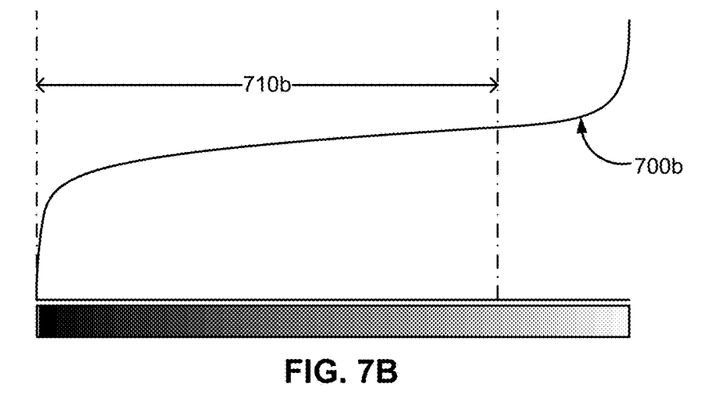
FIG. 7B illustrates tone curve for the image of FIG. 6B, according to one embodiment.
Figure 7C:
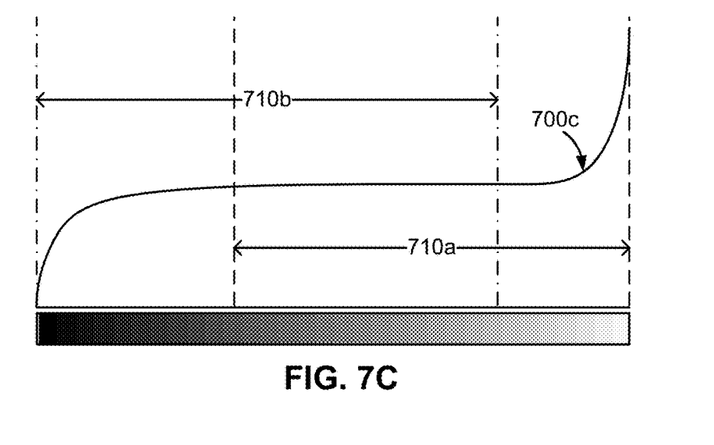
FIG. 7C illustrates tone curve for the image of FIG. 6C, according to one embodiment.

FIGS. 7A-C illustrate tone curves for images 600a, 600b, and 600c, respectively, of the environment 500 captured by a spherical camera system 100, according to one embodiment. The tone curves are based on the luminance information associated with each image. FIG. 7A shows a tone curve 700a for image 600a of FIG. 6A, the content of which is primarily bright. This is reflected in the tone curve 700a by its generally increasing slope as the luminance values increase. Because the tone curve 700a indicates that more of the image is brighter rather than darker, the slope of the tone curve is smaller for the dark region of the luminance spectrum than for the lighter region of the luminance spectrum. Accordingly, less information is lost if the corresponding bit assignment scheme assigns the majority of the bit values to luminance values within the range 710a and compresses the luminance values outside of range 710a. FIG. 7B shows a tone curve 700b for image 600b of FIG. 6B, the content of which is primarily dark. This is reflected in the tone curve 700b by its initially steep slope at lower luminance values. Because the tone curve 700b indicates that more of the image is darker rather than brighter, the slope of the tone curve is greater for the dark region of the luminance spectrum than for the lighter region of the luminance spectrum. Accordingly, less information would be lost if the corresponding bit assignment scheme assigns the majority of the bit values to luminance values within the range 710b and compresses the luminance values outside of range 710b.

FIG. 7C shows a tone curve 700c for combined image 600c of FIG. 6C, which includes sloped regions corresponding to both dark and bright content. Ranges 710a and 710b of FIGS. 7A and 7B are overlaid onto the tone curve 700c to illustrate how the tone curves of FIGS. 7A and 7B are combined to form the tone curve of FIG. 7C. As described below, a bit assignment scheme corresponding to tone curve 700c of the same bit depth as those corresponding to tone curves 700a and 700b would result in luminance information being compressed, and thus at least partially lost at both ends of the luminance spectrum, resulting in less detail in both the darkest and brightest portions of the combined image 600c.

Figure 8:
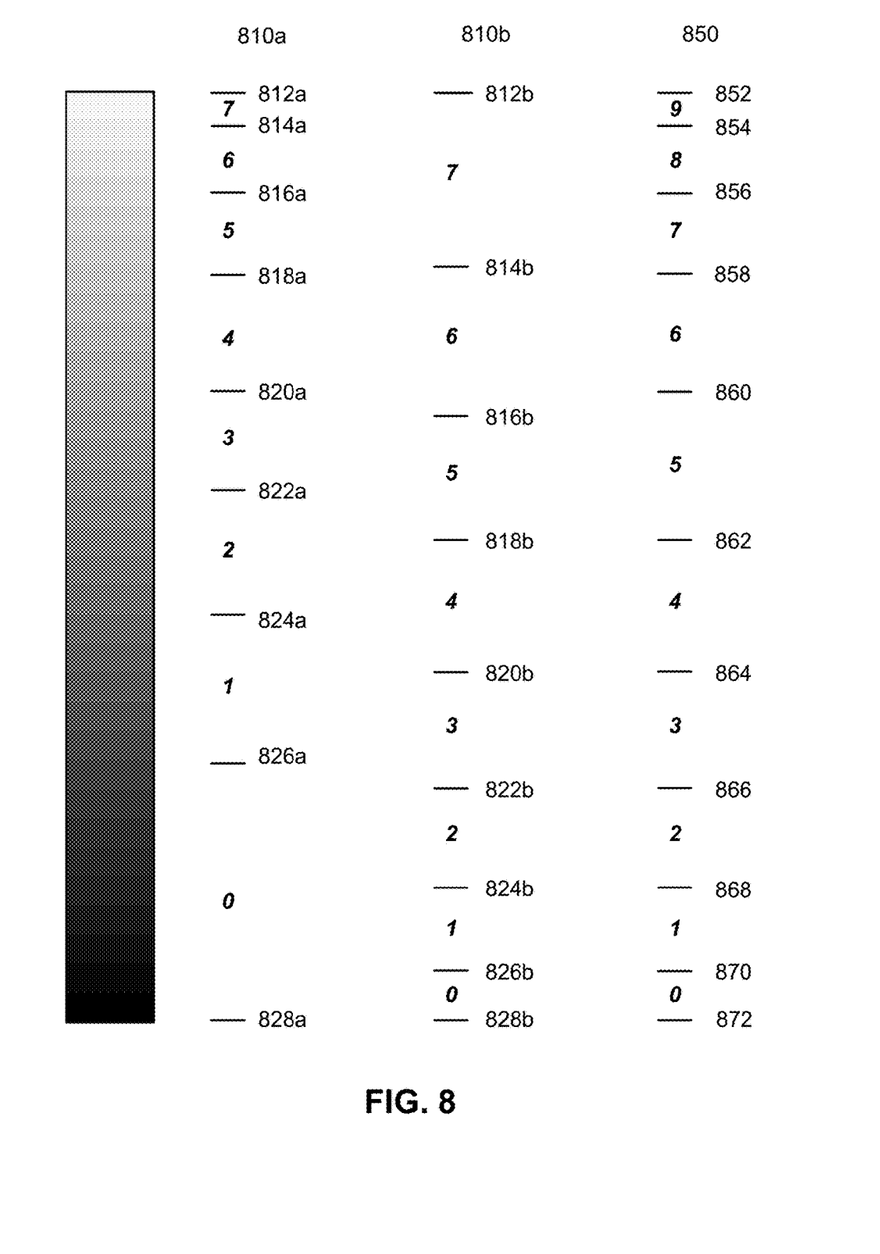
FIG. 8 illustrates example bit assignment schemes for the tone curves of FIGS. 7A-C, according to one embodiment.

FIG. 8 illustrates example bit assignment schemes for images 600a, 600b, and 600c captured by a spherical camera system, according to one embodiment. Bit assignment scheme 810a corresponds to image 600a. Bit assignment scheme 810a has a bit depth of 8 bits and is applied as follows: luminance values that fall between 812a and 814a are assigned a bit value of 7, those between 814a and 816a are assigned a bit value of 6, those between 816a and 818a are assigned a bit value of 5, those between 818a and 820a are assigned a bit value of 4, those between 820a and 822a are assigned a bit value of 3, those between 822a and 824a are assigned a bit value of 2, those between 824a and 826a are assigned a bit value of 1, and those between 826a and 828a are assigned a bit value of 0. However, because bit assignment 810a compresses luminance values on the dark end of the spectrum more than on the light end of the spectrum, the range of luminance values assigned to a particular bit value becomes greater as the luminance values become darker. In some embodiments, the luminance values assigned to the largest bit value is greater than the range of luminance values assigned to the smallest bit value, but the ranges of luminance values assigned to intermediate bit values may not follow this trend (for instance, based on luminance characteristics associated with the image).

Bit assignment scheme 810b corresponds to image 600b. Bit assignment scheme 810b has a bit depth of 8 bits and is applied as follows: luminance values that fall between 812b and 814b are assigned a bit value of 7, those between 814b and 816b are assigned a bit value of 6, those between 816b and 818b are assigned a bit value of 5, those between 818b and 820b are assigned a bit value of 4, those between 820b and 822b are assigned a bit value of 3, those between 822b and 824b are assigned a bit value of 2, those between 824b and 826b are assigned a bit value of 1, and those between 826b and 828b are assigned a bit value of 0. However, because bit assignment 810b compresses luminance values on the light end of the spectrum more than on the dark end of the spectrum, the range of luminance values assigned to a particular bit value becomes greater as the luminance values become lighter. In some embodiments, the luminance values assigned to the smallest bit value is greater than the range of luminance values assigned to the largest bit value, but the ranges of luminance values assigned to intermediate bit values may not follow this trend (for instance, based on luminance characteristics associated with the image).

Bit assignment scheme 850 corresponds to combined image 600c. Bit assignment scheme 850 has a bit depth of 10 bits and is applied as follows: luminance values that fall between 852 and 854 are assigned a bit value of 9, those between 854 and 856 are assigned a bit value of 8, those between 856 and 858 are assigned a bit value of 7, those between 858 and 860 are assigned a bit value of 6, those between 860 and 862 are assigned a bit value of 5, those between 862 and 864 are assigned a bit value of 4, those between 864 and 866 are assigned a bit value of 3, those between 866 and 868 are assigned a bit value of 2, between 868 and 870 are assigned a bit value of 1, and those between 870 and 872 are assigned a bit value of 0. Because image 600c has both light and dark features, bit assignment scheme 850 does not compress one end of the luminance spectrum significantly more than the other. Instead, the range of luminance values assigned to each bit value is substantially the same. In some embodiments, the ranges of luminance values are not exactly the same size, but they are more similar in size than the ranges of luminance values at the ends of the luminance spectrum of both bit assignment schemes 810a and 810b.

Bit assignment scheme 850 has a greater bit depth (10 bits) than both bit assignment schemes 810a and 810b (8 bits each). In some embodiments, the bit depth for bit assignment scheme 850 is determined by the values of bit assignment schemes 810. In generating this expanded bit depth, the bit values of bit assignment schemes 810a and 810b are mapped to those of bit assignment scheme 850. In one embodiment, the most detailed halves of the bit assignment schemes 810a and 810b are combined to form bit assignment scheme 850. For example, bit scheme 810b is used for the lower half of the luminance spectrum, and bit assignment scheme 810a is used for the higher half of the luminance spectrum. Thus, bit assignment scheme 850 is as follows: luminance values that fall between 852 and 854, which respectively correspond to 812a and 814a of bit assignment scheme 810a, are assigned a bit value of 9; those that fall between 854 and 856, which respectively correspond to 814a and 816a of bit assignment scheme 810a, are assigned a bit value of 8; those between 856 and 858, which respectively correspond to 816a and 818a of bit assignment scheme 810a, are assigned a bit value of 7; those between 858 and 860, which respectively correspond to 818a and 820a of bit assignment scheme 810a, are assigned a bit value of 6; those between 860 and 862, which respectively correspond to 820a of bit assignment scheme 810a and 818b of bit assignment scheme 810b, are assigned a bit value of 5; those between 862 and 864, which respectively correspond to 818b and 820b of bit assignment scheme 810b, are assigned a bit value of 4; those between 864 and 866, which respectively correspond to 820b and 822b of bit assignment scheme 810b, are assigned a bit value of 3; those between 866 and 868, which respectively correspond to 822b and 824b of bit assignment scheme 810b, are assigned a bit value of 2; those between 868 and 870, which respectively correspond to 824b and 826b of bit assignment scheme 810b, are assigned a bit value of 1; and those between 870 and 872, which respectively correspond to 826b and 828b of bit assignment scheme 810b, are assigned a bit value of 0. In some embodiments, 862 corresponds to 822a of bit assignment 810a instead of 818b of bit assignment 810b. In this mapping, details are preserved in both the lighter and darker ends of the luminance spectrum.

Figure 9:
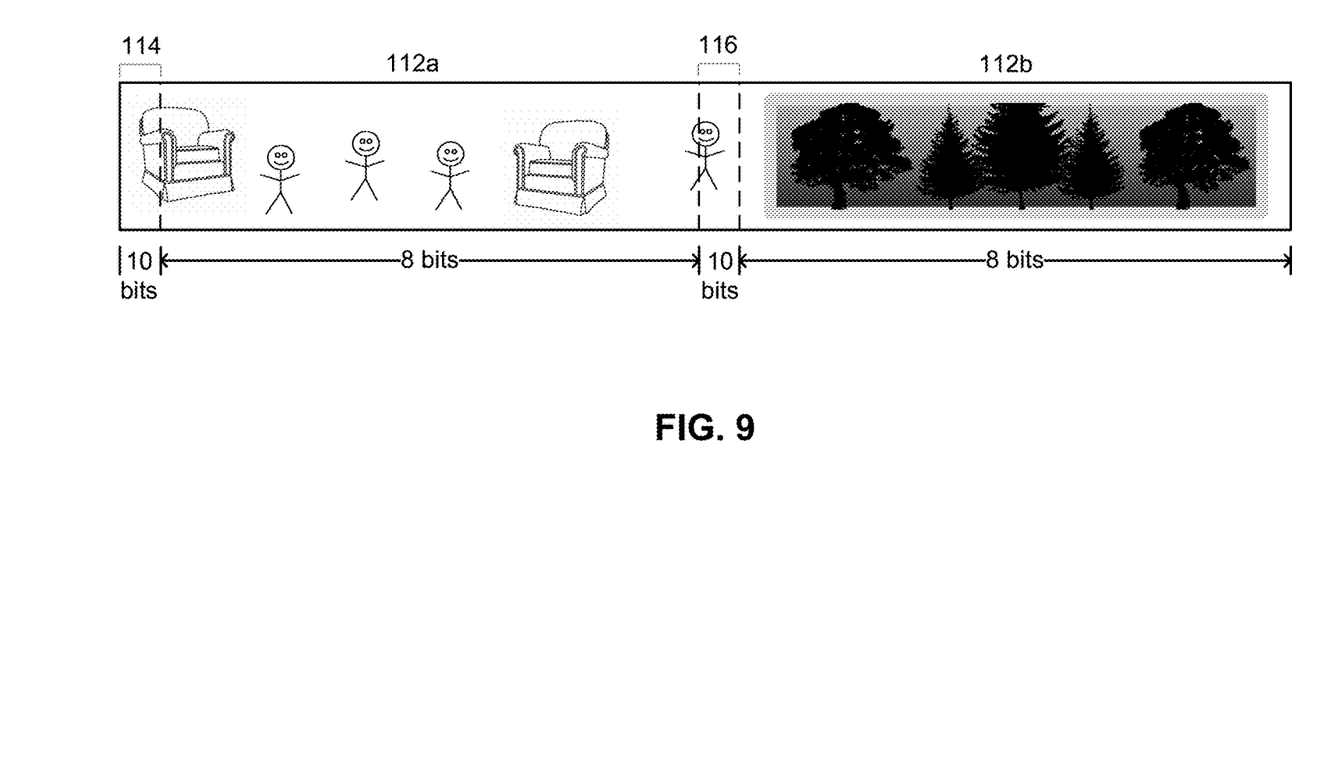
FIG. 9 illustrates a combined image with expanded tone map bit depth in overlapping regions, according to one embodiment.

FIG. 9 illustrates the tone-mapped combined image 600c with expanded bit depth in overlapping regions 114 and 116, according to one embodiment. In each of the non-overlapping regions 112a and 112b, the image-specific bit assignments 810a and 810b are used, so pixels in these combined images regions have a bit depth of 8 bits. In the overlapping regions 114 and 116, the combined bit assignment 850 is used, so pixels in these regions have a bit depth of 10 bits. In some embodiments, the combined bit assignment 860 is used for the entire combined image 600c, and thus pixels for the entire image have a bit depth of 10 bits.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method comprising:
accessing a plurality of images having overlapping regions and synchronously captured by a multi-camera array;
for each image of the plurality of images:
generating a tone map corresponding to the image based on luminance information of the image; and
encoding the image using the tone map to create a tone-mapped image, the tone-mapped image having pixels of a first bit depth;
wherein the generated tone map is different from at least one other tone map corresponding to another image of the plurality of images; and
combining the plurality of tone-mapped images to form a combined image having at least one region corresponding to one or more of the overlapping regions, wherein combining the plurality of tone-mapped images comprises combining the tone maps corresponding to the tone-mapped images to produce a combined tone map such that the at least one region corresponding to the one or more of the overlapping regions has pixels of a second bit depth greater than the first bit depth.

2. The method of claim 1, wherein the multi-camera array is a spherical camera system.

3. The method of claim 2, wherein the spherical camera system comprises two cameras, and wherein the plurality of images comprises two images.

4. The method of claim 1, wherein generating a tone map corresponding to the image based on luminance information of the image comprises:
identifying image luminance information;
generating a tone curve based on the identified luminance information; and
creating a bit assignment scheme of the first bit depth, the bit assignment scheme mapping ranges of luminance values defined by the tone curve to bit values,
wherein creating a tone-mapped image with pixels of a first bit depth comprises:
assigning each pixel of the tone-mapped image a bit value based on the bit assignment scheme and the luminance value of the pixel.

5. The method of claim 4, wherein combining the plurality of tone-mapped images to form a combined image comprises:
combining the bit assignment schemes of each image of the plurality of images to form a combined bit assignment scheme;
mapping each bit value from the bit assignment schemes of the plurality of images to a bit value in the combined bit assignment scheme; and
assigning each pixel in the region corresponding to one or more of the overlapping regions an updated bit value based on the combined bit assignment scheme.

6. The method of claim 1, wherein the tone map is also generated based on image content.

7. The method of claim 1, wherein the entirety of the combined image has pixels of a second bit depth.

8. A system comprising:
a processor; and
a non-transitory computer-readable medium comprising instructions that when executed by the processor cause the processor to:
access a plurality of images having overlapping regions and synchronously captured by a multi-camera array;
for each image of the plurality of images:
generate a tone map corresponding to the image based on luminance information of the image; and
encode the image using the tone map to create a tone-mapped image, the tone-mapped image having pixels of a first bit depth;
wherein the generated tone map is different from at least one other tone map corresponding to another image of the plurality of images; and
combine the plurality of tone-mapped images to form a combined image having at least one region corresponding to one or more of the overlapping regions, wherein combining the plurality of tone-mapped images comprises combining the tone maps corresponding to the tone-mapped images to produce a combined tone map such that the at least one region corresponding to the one or more of the overlapping regions has pixels of a second bit depth greater than the first bit depth.

9. The system of claim 8, wherein the multi-camera array is a spherical camera system.

10. The system of claim 9, wherein the spherical camera system comprises two cameras, and wherein the plurality of images comprises two images.

11. The system of claim 8, wherein the instructions to generate a tone map corresponding to the image based on luminance information of the image comprise:
identify image luminance information;
generate a tone curve based on the identified luminance information; and
create a bit assignment scheme of the first bit depth, the bit assignment scheme mapping ranges of luminance values defined by the tone curve to bit values,
wherein the instructions to create a tone-mapped image with pixels of a first bit depth comprise instructions to:
assign each pixel of the tone-mapped image a bit value based on the bit assignment scheme and the luminance value of the pixel.

12. The system of claim 11, wherein the instructions to combine the plurality of tone-mapped images to form a combined image comprise:
combine the bit assignment schemes of each image of the plurality of images to form a combined bit assignment scheme;
map each bit value from the bit assignment schemes of the plurality of images to a bit value in the combined bit assignment scheme; and
assign each pixel in the region corresponding to one or more of the overlapping regions an updated bit value based on the combined bit assignment scheme.

13. The system of claim 8, wherein the tone map is also generated based on image content.

14. The system of claim 8, wherein the entirety of the combined image has pixels of a second bit depth.

15. A non-transitory computer-readable medium comprising instructions that when executed by a processor cause the processor to:
access a plurality of images having overlapping regions and synchronously captured by a multi-camera array;
for each image of the plurality of images:

generate a tone map corresponding to the image based on luminance information of the image; and encode the image using the tone map to create a tone-mapped image, the tone-mapped image having pixels of a first bit depth;

wherein the generated tone map is different from at least one other tone map corresponding to another image of the plurality of images; and combine the plurality of tone-mapped images to form a combined image having at least one region corresponding to one or more of the overlapping regions, wherein combining the plurality of tone-mapped images comprises combining the tone maps corresponding to the tone-mapped images to produce a combined tone map such that the at least one region corresponding to the one or more of the overlapping regions has pixels of a second bit depth greater than the first bit depth.

16. The non-transitory computer-readable medium of claim 15, wherein the multi-camera array is a spherical camera system.

17. The non-transitory computer-readable medium of claim 16, wherein the spherical camera system comprises two cameras, and wherein the plurality of images comprises two images.

18. The non-transitory computer-readable medium of claim 15, wherein the instructions to generate a tone map corresponding to the image based on luminance information of the image comprise:

identify image luminance information;

generate a tone curve based on the identified luminance information; and create a bit assignment scheme of the first bit depth, the bit assignment scheme mapping ranges of luminance values defined by the tone curve to bit values, wherein the instructions to create a tone-mapped image with pixels of a first bit depth comprise instructions to:
assign each pixel of the tone-mapped image a bit value based on the bit assignment scheme and the luminance value of the pixel.

19. The non-transitory computer-readable medium of claim 18, wherein the instructions to combine the plurality of tone-mapped images to form a combined image comprise:

combine the bit assignment schemes of each image of the plurality of images to form a combined bit assignment scheme;

map each bit value from the bit assignment schemes of the plurality of images to a bit value in the combined bit assignment scheme; and assign each pixel in the region corresponding to one or more of the overlapping regions an updated bit value based on the combined bit assignment scheme.

20. The non-transitory computer-readable medium of claim 15, wherein the entirety of the combined image has pixels of a second bit depth.

* * * * *